United States Patent [19]

Obama et al.

[11] Patent Number: 4,831,893
[45] Date of Patent: May 23, 1989

[54] JOINT DEVICE

[75] Inventors: Masao Obama, Yokosuka; Mitsunori Kondoh; Kunio Wakabayashi, both of Yokohama, all of Japan

[73] Assignee: Kabushiki Kaisha Toshiba, Kawasaki, Japan

[21] Appl. No.: 81,316

[22] Filed: Aug. 4, 1987

[30] Foreign Application Priority Data

Aug. 8, 1986 [JP] Japan .................................. 61-186501

[51] Int. Cl.$^4$ ....................... B25J 17/00; F16D 11/10
[52] U.S. Cl. ........................................ 74/479; 60/528; 192/67 R; 192/82 T; 192/84 R; 192/90; 901/26; 901/28
[58] Field of Search ................... 74/479; 60/527, 528; 192/67 R, 82 T, 84 R, 90; 337/140; 901/25, 26, 28, 29

[56] References Cited

U.S. PATENT DOCUMENTS

| | | | |
|---|---|---|---|
| 4,480,495 | 11/1984 | Obama | 901/28 X |
| 4,550,695 | 11/1985 | Kikuchi et al. | 192/82 T X |
| 4,586,335 | 5/1986 | Hosoda et al. | 60/528 |
| 4,606,695 | 8/1986 | Lenz | 901/28 X |
| 4,680,022 | 7/1987 | Hoshino et al. | 901/28 X |
| 4,685,861 | 8/1987 | Huetsch | 901/26 X |

FOREIGN PATENT DOCUMENTS

| | | |
|---|---|---|
| 0106561 | 4/1984 | European Pat. Off. . |
| 2150635 | 4/1973 | France . |
| 60-211126 | 10/1985 | Japan . |
| 524685 | 11/1976 | U.S.S.R. ................. 901/25 |
| 2041879 | 9/1980 | United Kingdom . |

Primary Examiner—Allan D. Herrmann
Attorney, Agent, or Firm—Oblon, Fisher, Spivak, McClelland & Maier

[57] ABSTRACT

A joint device according to the present invention is attached to each of a plurality of arm units which constitute an arm of an industrial robot, and is used to connect a first arm unit and a second arm unit adjacent thereto, and to rock the arm units. The joint device comprises a coupling mechanism which connects the first and second arm units for rotation around specified axes. A first gear train, which includes a plurality of gears, is provided in the first arm unit, and has a rotatory-force transmission path through which the gears thereof successively transmit a rotatory force. A first rotatory-force source is used to transmit the rotatory force to the first gear train. The second arm unit is constructed in the same manner as the first arm unit. A clutch mechanism serves to permit and interrupt the transmission of the rotatory force through the rotatory-force transmission path of the first gear train. If the joint device fails for any reason, the transmission of the rotatory force through the transmission path of the first gear train is interrupted. As a result, the first and second arm units are released from their reciprocal restraint. Thus, even in case of any failure of the joint device, the robot can be removed easily from a job site.

11 Claims, 6 Drawing Sheets

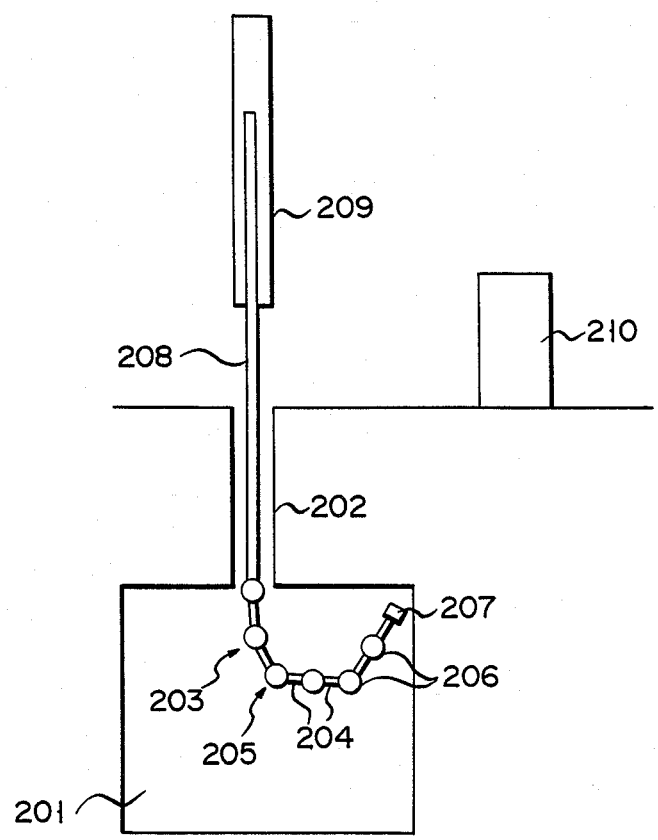
F I G. 1

JOINT DEVICE

BACKGROUND OF THE INVENTION

The present invention relates to a joint device which is attached to each of arm units, constituting a arm of a robot, and is used to connect an arm unit and another arm unit adjacent thereto, and to rock the arm units.

In nuclear fuel reprocessing plants, facilities, such as tower tanks, nuclear reactors, fusion reactors, shielding cells, etc., have neither an entrance nor a space large enough to allow technical personnel to enter or work in. Also, these facilities are subject to harmful radioactive rays and the like. Usually, therefore, the personnel cannot directly enter the facilities to check them or work therein. With these facilities, it is necessary that the working person locate himself at a safe site and remotely operate a robot, situated in the facilities, or be allowed to enter them through a small entrance to work therein.

As shown in FIG. 1, for example, a robot may be used to inspect a spot which is unaccessible to the personnel. Entrance 202 is connected to object 201 of inspection, such as a tank. Robot 203 is inserted into tank 201 through entrance 202. Robot 203 is a multijoint robot having arm 205 which is composed of a plurality of arm units 204. Each unit 204 is coupled to its adjacent arm unit 204 by means of joint device 206. Device 206 allows the adjacent arm units to rock. Television camera 207, used for inspection inside tank 201, is attached to the distal end of arm 205. Arm 205 is supported by supporting device 208, which is moved up and down by means of lift deice 209. Control device 210 for controlling robot 203 is located outside tank 201.

Conventionally, a joint device is constructed as follows. It comprises a coupling mechanism and an arm unit rocking mechanism which are arranged so that an arm unit and another arm unit adjacent thereto are rotatable in a predetermined direction. The arm-unit rocking mechanism includes a semicircular gear for rocking the arm units, a gear train used to transmit a rotatory force to the semicircular gear, and a motor for supplying the rotatory force to the gear train. Thus, if the motor is driven, its rotatory force is transmitted to the semicircular gear through the gear train. The semicircular gear causes the one arm unit to rock relatively to the other arm unit, in the predetermined direction.

One or a plurality of joint devices may sometimes get out of order during an inspection in a tank. More specifically, the motor may be disabled, or otherwise, gear teeth or bearings for the gears may be broken or fail.

If the joint devices thus get out of order, the robot is removed from the tank and repaired. In this case, the arm units should preferably be free to rotate relatively to one another. In case of such a trouble, however, the output shaft of the motor is disabled from rotating due to its regenerative braking. Moreover, the reduction ratio of the gear train is so high that the motor shaft, gear train, and semicircular gear are restrained from rotating. In consequence, the rotation of the arm units is restrained, that is, one arm unit is not free to rotate relatively to another.

Accordingly, the arm units engage the inner surface of entrance 202, so that robot 203 sometimes cannot pass through the entrance. In some cases, therefore, it is difficult to remove robot 203 from tank 201.

If a plurality of joint devices get out of order when arm 205 is arcuated as shown in FIG. 1, in particular, robot 203 can hardly be removed from tank 201 through straight entrance 202.

SUMMARY OF THE INVENTION

The object of the present invention is to provide a joint device which is attached to each of arm units, constituting an arm of a robot, and whereby rotation of an arm unit and another arm unit adjacent thereto can be released from restraint, so that the robot can be removed easily from a job site, if the joint device gets out of order.

A joint device according to the present invention is constructed as follows.

The joint device is attached to each of arm units constituting an arm of a robot, and is used to connect a first arm unit and a second arm unit adjacent thereto, and to drive the arm units.

The joint device comprises a coupling mechanism which connects the first and second arm units. The coupling mechanism has a first axis extending in one direction and a second axis extending substantially at right angles to the first axis. The first and second arm units are rotatable around the first and second axes.

A first semicircular gear is attached to the coupling mechanism so that the central axis thereof is identical with the first axis. A first gear train, which includes a plurality of gears, is provided in the first arm unit. The first gear train has a rotatory force transmission path through which the gears thereof successively transmit a rotatory force. One of the gears of the first gear train is in mesh with the first semicircular gear.

A first rotatory-force source serves to transmit the rotatory force to the first gear train;

A second semicircular gear is attached to the coupling mechanism so that the central axis thereof is identical with the second axis. A second gear train, which includes a plurality of gears, is provided in the second arm unit. The second gear train has a rotatory force transmission path through which the gears thereof successively transmit a rotatory force. One of the gears of the second gear train is in mesh with the second semicircular gear.

A second rotatory-force source serves to apply the rotatory force to the second gear train.

A clutch mechanism capable permits and interrupts the transmission of the rotatory force through the rotatory-force transmission path of the first or second gear train.

Thus, while the clutch mechanism maintains the transmission of the rotatory force through the rotatory-force transmission path of the first or second gear train, the rotatory force is transmitted from the rotatory-force source to the first or second semicircular gear through the transmission path. As a result, the first or second arm unit is rocked.

If the joint device fails for any reason, the transmission of the rotatory force through the transmission path of the first gear train is interrupted. As a result, the first and second arm units are released from their reciprocal restraint, that is, they become free to rotate, depending on the shape of passages at a job site or the like. Thus, even in case of any trouble of the joint device, the robot can be removed easily from the job site.

BRIEF DESCRIPTION OF THE DRAWINGS

FIG. 1 is a schematic view showing the way a robot having joint devices operates;

DETAILED DESCRIPTION OF THE PREFERRED EMBODIMENTS

Figure 2:
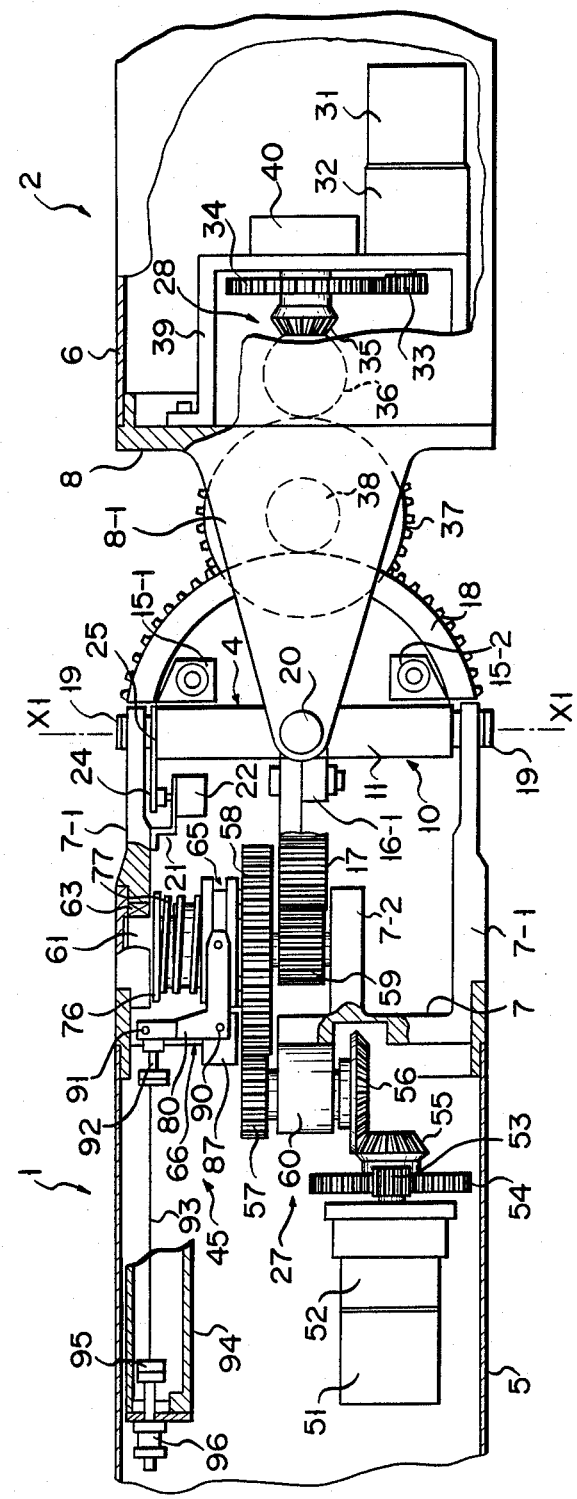
FIG. 2 is a sectional view of the respective end portions of first and second arm units fitted with a joint device according to the present invention.

An arm of a robot is composed of a plurality of arm units. Each two adjacent arm units are coupled by means of a joint device. When the joint device is driven, the arm units are rocked. For convenience, therefore, an embodiment of the present invention will be described with reference to the sectional view of FIG. 2, which shows one end portion of one arm unit and the other end portion of another arm unit adjacent thereto.

First arm unit 1 includes cylindrical member 5, which has support member 7 attached to the end portion thereof. Two support plates 7-1 extend parallel to each other from member 7. Likewise, second arm unit 2 includes cylindrical member 6 having support member 8 at its end portion. Two support plates 8-1 (only one shown in FIG. 2) extend parallel to each other from member 8.

Figure 4:
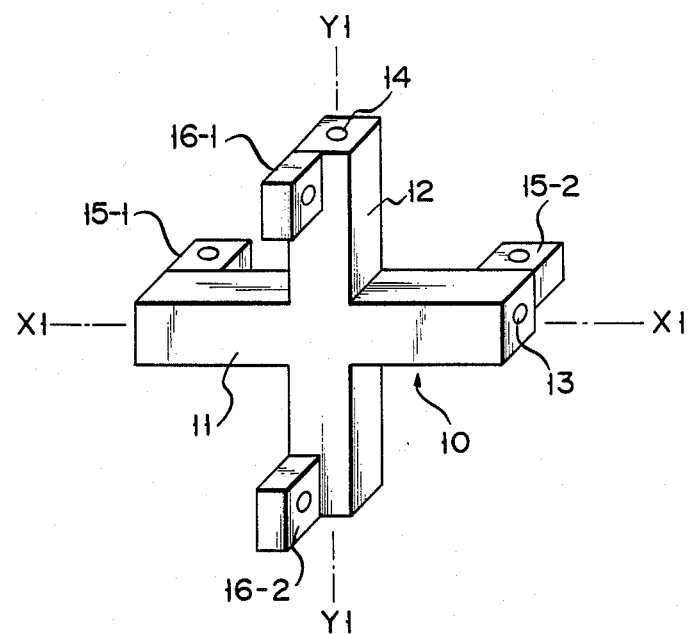
FIG. 4 is a perspective view of a coupling member connecting the first and second arms.

The respective distal ends of support plates 7-1 and 8-1 are supported by coupling mechanism 4. As shown in FIG. 4, mechanism 4 is provided with coupling member 10 which has two shaft members 11 and 12 crossing at right angles. Members 11 and 12 have central axes X1-X1 and Y1-Y1, respectively. Hole 13 is formed in each end face of shaft member 11, while hole 14 is formed in each end face of shaft member 12. As shown in FIG. 2, member 11 is located between the respective distal end portions of support plates 7-1, while member 12 is located between the respective distal end portions of support plates 8-1. Pin 19 is passed through a hole (not shown) in each corresponding support plate 7-1, and is fitted in each corresponding hole 13 of shaft member 11. Likewise, pin 20 is passed through a hole (not shown) in each corresponding support plate 8-1, and is fitted in each corresponding hole 14 of shaft member 12. Thus, shaft members 11 and 12 are rotatable relatively to support shafts 7-1 and 8-1, around axes X1-X1 and Y1-Y1, respectively.

Projections 15-1 and 15-2 are provided individually at two opposite end portions of shaft member 11. They are located symmetrically with respect to axis Y1-Y1. Likewise, projections 16-1 and 16-2 are provided individually at two opposite end portions of shaft member 12, as shown in FIG. 4. They are located symmetrically with respect to axis X1-X1. Projections 16-1 and 16-2 are fixedly fitted with two opposite end portions of semicircular gear 17. Likewise, projections 15-1 and 15-2 are fixedly fitted with two opposite end portions of semicircular gear 18. The central axes of gears 17 and 18 are identical with axes X1-X1 and Y1-Y1, respectively.

First arm unit 1 comprises first gear train 27 and motor 51 used to drive it. Gear train 27 includes a plurality of gears, among which gear 59 is in mesh with semicircular gear 17. First gear train 27 will be described in detail later. Potentiometer 22 is mounted on bracket 21 which is attached to one of support plates 7-1. Gear 24 is mounted on a shaft which extends from potentiometer 22. It is in mesh with gear 25 which is fixed to shaft member 11.

Thus, when motor 51 is driven in arm unit 1, its rotatory force is transmitted to semicircular gear 17 via first gear train 27. Thereupon, gear 17 is rocked around axis X1-X1, or otherwise, gear 59 revolves around gear 17. As a result, arm unit 1 or 2 is rocked around axis X1-X1.

Second arm unit 2 comprises second gear train 28 and motor 31 used to drive it. Gear train 28 includes a plurality of gears, one of which is in mesh with a semicircular gear. The second gear train further includes speed reducer 32 and gears 33 to 38. Reducer 32 is supported by support member 39, and its shaft (not shown) is coupled to the shaft (not shown) of motor 31. Gear 33 is mounted on the shaft (not shown) of reducer 32. Gear 34 is in mesh with gear 33. The shaft of gear 34 is supported by bearing 40 which is attached to support member 39. Bevel gear 35 is mounted on the shaft of gear 34. Bevel gear 35 is in mesh with bevel gear (not shown) which is arranged coaxially with gear 36. Gears 37 and 38 are arranged coaxially with each other. Gear 36 is in mesh with gear 37, while gear 38 is in mesh with semicircular gear 18.

Thus, when motor 31 is driven in arm unit 2, its rotatory force is transmitted to semicircular gear 18 via second gear train 28. Thereupon, gear 18 is rocked around axis Y1-Y1, or otherwise, gear 38 revolves around gear 18. As a result, arm unit 1 or 2 is rocked around axis Y1-Y1.

Figure 3:
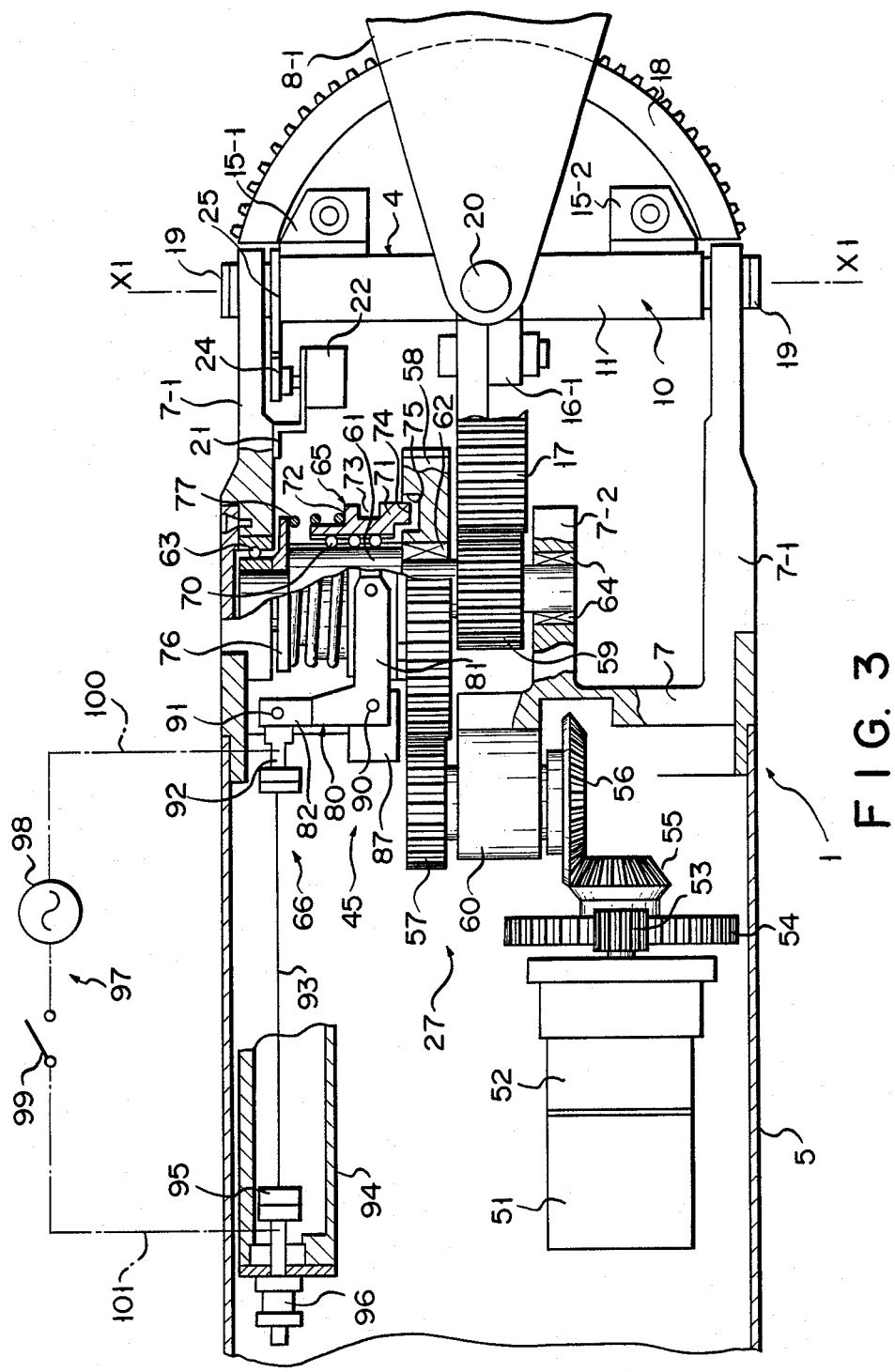
FIG. 3 is an enlarged view of the end portion of the first arm unit shown in FIG. 2.

Referring now to FIG. 3, first gear train 27 of arm unit 1 will be described.

First gear train 27 includes speed reducer 52 and gears 53 to 59. Reducer 52 is coupled to motor 51. Gear 53 is mounted on the shaft (not shown) of reducer 52. Gear 54 is in mesh with gear 53. The shaft of gear 54 is coaxial with that of bevel gear 55, which is in mesh with bevel gear 56. The shaft of gear 56 is coaxial with gear 57. The shafts of gears 56 and 57 are supported by bearing 60, which is attached to support member 7. Gear 57 is in mesh with gear 58. Gear 58 is supported by bearing 62, which, in its turn, is supported by shaft 61. Thus, gear 58 is rotatable relatively to shaft 61. However, the relative rotation of gear 58 and shaft 61 is restrained by clutch mechanism 45, which will be mentioned later. Gear 59 is fixed to shaft 61, and is in mesh with semicircular gear 17.

As described above, the joint device is composed of first and second gear trains 27 and 28, motors 51 and 31, and coupling mechanism 4.

Figure 5:
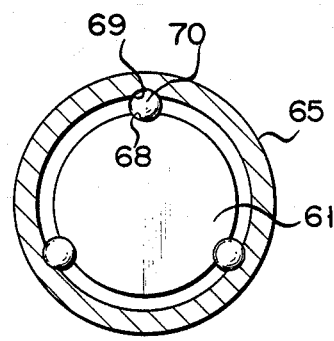
FIG. 5 is a sectional view showing a cylindrical member and a shaft spline-fitted therein.
Figure 6:
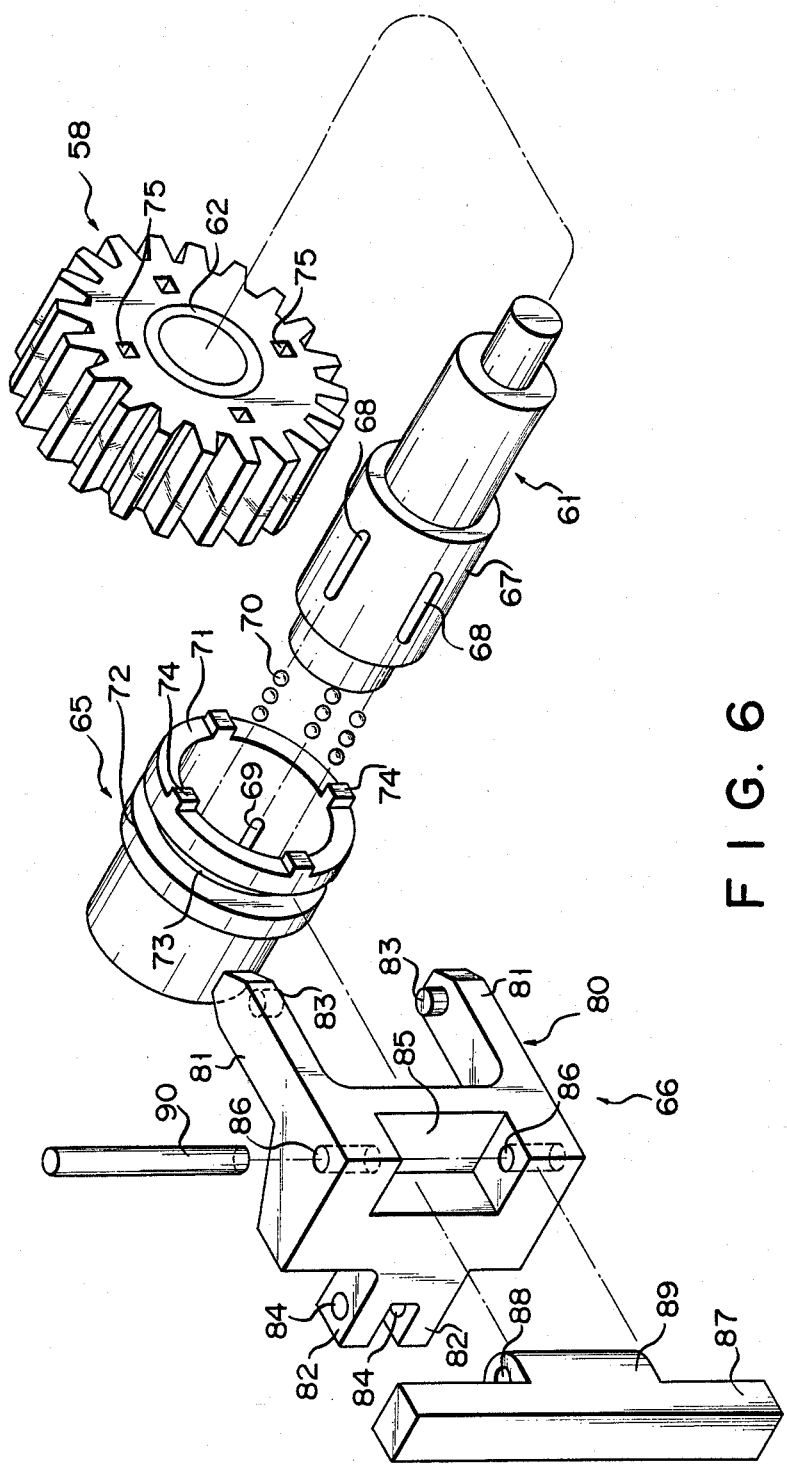
FIG. 6 is an exploded perspective view of a clutch device.

Referring now to FIGS. 3, 5 and 6, clutch mechanism 45 will be described which permits or restrains the relative rotation between gear 58 and shaft 61.

Clutch mechanism 45 includes shaft 61, gear 58, cylindrical member 65, and mechanism for moving member 65 axially.

One end of shaft 61 is rotatably supported by bearing 64 which is attached to support arm 7-2. Also, the other end of shaft 61 is rotatably supported by bearing 63 which is attached to one of support arms 7-1. As shown in FIG. 6, shaft 61 has large-diameter portion 67. Axially extending spline channels 68 are formed on the outer peripheral surface of portion 67.

Cylindrical member 65 is spline-connected to large-diameter portion 67 of shaft 61. Spline channels 69 are formed on the inner peripheral surface of member 65. When member 65 is fitted on portion 67, as shown in FIG. 5, balls 70 are held between each pair of channels 68 and 69. Thus, cylindrical member 65 can move only in its axial direction, and cannot rotate relatively to shaft 61.

As shown in FIG. 6, moreover, cylindrical member 65 has circumferential flanges 71 and 72. Annular groove 73 is defined between flanges 71 and 72. Four projections 74 are arranged on the end face of flange 71. Mating recesses 75 are formed in one lateral face of gear 58. As shown in FIGS. 2 and 3, furthermore, spring 77 is interposed between flange 76, fixed to shaft 61, and flange 72. It serves to press cylindrical member 65 against gear 58.

Thus, cylindrical member 65 is continually urged in the axial direction by spring 77, so that projections 74 are fitted in their corresponding recesses 75. In this state, member 65 cannot rotate relative to neither shaft 61 nor gear 58. Accordingly, member 65, shaft 61, and gear 58 rotate in one. When motor 51 is driven at this time, its rotatory force is transmitted to semicircular gear 17 through all the gears of first gear train 27.

Mechanism 66 serves to move cylindrical member 65 in the axial direction, against the urging force of spring 77. This mechanism will now be described in detail.

As shown in FIG. 6, mechanism 66 includes crank member 80 which rocks around an axis. Member 80 is formed with a pair of first arms 81, which extend in one direction, and a pair of second arms 82 extending substantially at right angles to first arms 81. Projection 83 is formed on the distal end portion of each first arm 81. The paired first arms 81 are located holding cylindrical member 65 between them so that projections 83 are fitted in groove 73 of member 65. Hole 84 is formed in the distal end portion of each second arm 82. Further, crank member 80 has notch portion 85 which is continuous with holes 86 above and below it.

Holder 87 for rotatably supporting crank member 80 is fixed to support member 7. The holder is formed with pin holding portion 89 having hole 88. Holding portion 89 is held in notch portion 85 of crank member 80. Pin 90 is inserted in holes 86 of crank member 80 and hole 88 of holding portion 89. Thus, member 80 is rotated around pin 90.

As shown in FIG. 3, pin 91 is inserted in holes 84 of second arms 82 of crank member 80. Wire holder 92 is attached to pin 91. One end of wire 93, formed of a shape memory alloy, is coupled to wire holder 92. Wire 93 extends through guide cylinder 94, and the other end thereof is coupled to wire holder 95. Holder 95 is connected to tension adjuster 96.

Arm unit 1 is provided with current supply unit 97 for supplying current to wire 93. Unit 97 includes power source 98 and switch 99. Lead wire 100 extending from power source 98 is connected to the one end of wire 93 (wire holder 92), while lead wire 101 extending from switch 99 is connected to the other end of wire 93 (wire holder 95).

The shape memory alloy, for use as a material of wire 93, has the property of remembering predetermined shapes at low and high temperatures. If the temperature of the alloy is changed from low temperature to high temperature, its shape changes from the one specified shape at low temperature to the other specified shape at high temperature.

In the present invention, wire 93 remembers an extended shape at low temperature and a contracted shape at high temperature. Normally or at low temperature, therefore, wire 93 is extended, as shown in FIG. 3. If wire 93 is supplied with current from current supply unit 97, however, its temperature rises. When the temperature reaches a predetermined level, wire 93 contracts. Thus, crank member 80 is rotated around pin 90 by the contractile force of wire 93.

Figure 7:
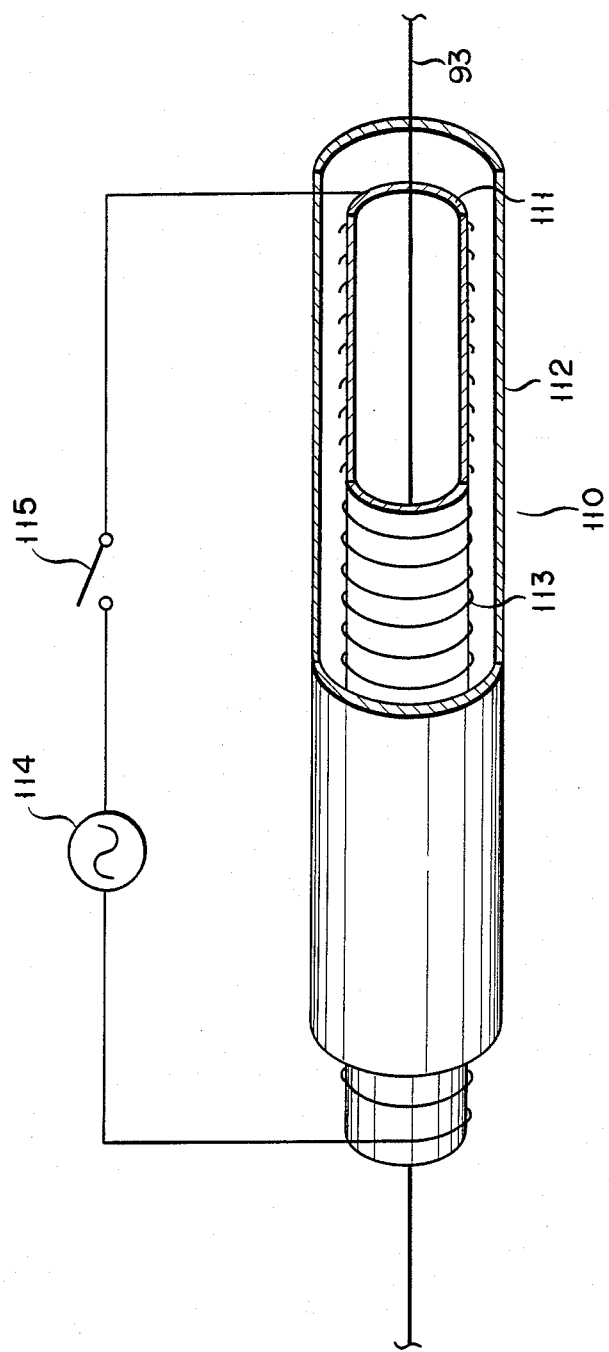
FIG. 7 is a perspective view of a heater.

When the electric resistance of wire 93 is small, wire 93 may be heated by heater 110 as shown in FIG. 7 without directly being heated by current Heater 110 is provided with first ceramic tube 111 covering wire 93, second ceramic tube 112 covering first ceramic tube 111, and heater coil 113 wound on the circumference of first ceramic tube 111. Power supply 114 for supplying current and switch 115 are connected to heater coil 113 When switch 115 is turned on, heat is generated by heater coil 113 and transmitted to wire 93. The temperature of wire 93 is thus increased and wire 93 is contracted. The heat generated by heater coil 113 does not escape to the outside of heater 110 by second ceramic tube 112.

The operation of the joint device according to the present invention will now be described.

First, the normal operation of the joint device will be described In this case, clutch mechanism 45 restrains rotation of gear 58 and cylindrical member 65. Since wire 93 is in a extended state, member 65 is pressed against gear 58 by spring 77, and projections 74 are fitted in their corresponding recesses 75. At the same time, shaft 61 and cylindrical member 65 are spline-connected to each other. Thus, shaft 61, gear 58, and member 65 rotates in a body.

If motor 51 is started, its rotatory force is transmitted to gear 58 via speed reducer 52 and gears 53 to 57. At this time, gear 58, shaft 61, and cylindrical member 65 rotates in one. When gear 58 rotates, therefore, shaft 61 is rotated by its rotatory force, so that gear 59 is also rotated. As a result, semicircular gear 17 is rotated around axis X1-X1, or otherwise, gear 59 revolves around gear 17. Accordingly, arm unit 1 or 2 is rotated around axis X1-X1, as mentioned before There will now be described the case that the joint device fails to operate normally If the joint device is out of order, arm units 1 and 2 conventionally are sometimes restrained from rotating relatively. In such a case, however, clutch mechanism 45 is actuated so that gear 58 is allowed to rotate relatively to shaft 61, and arm units 1 and 2 are free to rotate relatively to each other.

More specifically, if the joint device goes wrong, current is supplied from current supply unit 97 to wire 93. Heated in this manner, wire 93 contracts. Second arms 82 of crank member 80 are pulled by the contractile force of wire 93. Crank member 80 is rocked around pin 90, so that first arms 81 are rocked. Projections 83 of arms 81, which are fitted in groove 73 of cylindrical member 65, at this time, are moved in a direction such that member 65 goes away from gear 58, resisting the urging force of spring 77. Thereupon, projections 74 of cylindrical member 65 leave recesses 75 in the lateral face of gear 58, so that gear 58 is allowed to rotate relatively to shaft 61. In other words, the transmission of the rotatory force, through the rotatory-force transmission path of the first gear train, is interrupted. Accordingly, the first and second arm units are free to move relatively to each other.

Thus, in removing robot 203 from tank 201, as shown in FIG. 1, the first and second arm units are rotated freely, depending on the shape of entrance 202. Even if the joint device is out of order, therefore, the robot can be removed easily from a job site.

If a plurality of joint devices go wrong, moreover, a plurality of joints can be released from restraint simultaneously or separately.

If the joint device is to be subjected to reuse, furthermore, it is necessary only that wire 93 is extended by manually operating tension adjuster 96. When the temperature of wire 93 is low, however, wire 93 is extended. Thereupon, projections 74 of cylindrical member 65 are fitted into their corresponding recesses 75 of gear 58 by the urging force of spring 77, and the clutch mechanism maintains the transmission of the rotary force through the transmission path.

In the embodiment described above, first arm unit 1 is provided with the clutch mechanism. If second arm unit 2 is also provided with the clutch mechanism, the first and second arm units are free to rock not only around axis X1-X1, but also around axis Y1-Y1.

Wire 93 need not always be made of a shape memory alloy. If the wire is made of an ordinary metal, it is necessary only that the clutch mechanism be provided with means for applying a tensile force to the wire.

What is claimed is:

1. A joint device which is attached to each of a plurality of arm units constituting an arm of a robot, and is used to connect a first arm unit and a second arm unit adjacent thereto, and to drive the arm units, comprising:
   a coupling mechanism connecting the first and second arm units, said coupling mechanism having a first axis, extending in one direction, and a second axis, extending substantially in right angles to the first axis, said first and second arm units being rotatable around the first and second axes;
   a first semicircular gear, attached to the coupling mechanism so that the central axis thereof is identical with the first axis;
   a first gear train, in including a plurality of gears and provided in the first arm unit, said first gear train having a rotatory-force transmission path through which the gears thereof successively transmit a rotatory force, one of the gears of said first gear train being in mesh with the first semicircular gear;
   a first rotatory-force source, for transmitting the rotatory force to the first gear train;
   a second semicircular gear, attached to the coupling mechanism so that the central axis thereof is identical with the second axis;
   a second gear train, including a plurality of gears and provided in the second arm unit, said second gear train having a rotatory-force transmission path through which the gears thereof successively transmit a rotatory force, one of the gears of said second gear train being in mesh with the second semicircular gear;
   a second rotatory-force source, for transmitting the rotatory force to the second gear train; and
   a clutch mechanism capable of permitting and interrupting the transmission of the rotatory force through the rotatory-force transmission path of the first or second gear train,
   wherein said first gear train includes a first shaft and a first gear rotatably mounted thereon, and said clutch mechanism allows and prohibits the rotation of the first gear relative to the first shaft,
   wherein said clutch mechanism includes a cylindrical member spline-fitted on the first shaft, a spring for pressing the cylindrical member against a lateral of the first gear, and shifting means for moving the cylindrical member away from the first gear, against the urging force of the spring; said first gear, said first shaft, and said cylindrical member is pressed against the lateral face of the first gear by the spring; and said first gear is free to rotate relative to the first shaft when the cylindrical member is moved away from the first gear by the shifting means.

2. The joint device according to claim 1, wherein said first shaft is formed having, on the peripheral surface thereof, a spline channel extending in the axial direction thereof, and said cylindrical member is formed having, on the inner peripheral surface thereof, a spline channel extending in the axial direction thereof, a ball being interposed between said spline channels 3. The joint device according to claim 1, wherein said first gear has a recess in the lateral face thereof, and said cylindrical member has a projection adapted to be fitted in the recess, when the cylindrical member is pressed against the lateral face of the first gear.

4. The joint device according to claim 1, wherein said shifting means includes a wire and a crank member rockable around a third axis, said crank member having first and second arms, the distal end of said first arm being adapted to be fitted in a groove on the outer peripheral surface of the cylindrical member, one end of said wire being coupled to the distal end of the second arm, the other end of said wire being restrained.

5. The joint device according to claim 4, wherein said wire is made of a shape memory alloy.

6. The joint device according to claim 5, wherein said wire remembers an extended shape at low temperature and a contracted shape at high temperature.

7. The joint device according to claim 6, wherein said shifting means includes heat means for heating the wire, and the temperature of said wire rises, so that the wire contracts, when the heat is supplied to the wire.

8. The joint device according to claim 7, wherein the heat means includes current supply means for supplying current to the wire.

9. The joint device according to claim 7, wherein the heat means is provided with first ceramic tube covering wire, second ceramic tube covering first ceramic tube, and heater coil wound on the circumference of first ceramic tube.

10. The joint device according to claim 4, wherein the other end of said wire is coupled to a tension adjuster.

11. The joint device according to claim 1, wherein said first shaft is fixedly fitted with a gear in mesh with the first semicircular gear.

* * * * *